Jan. 2, 1940.  E. G. GRENNON  2,185,808
CHECKING AND MEASURING DEVICE
Filed April 7, 1938
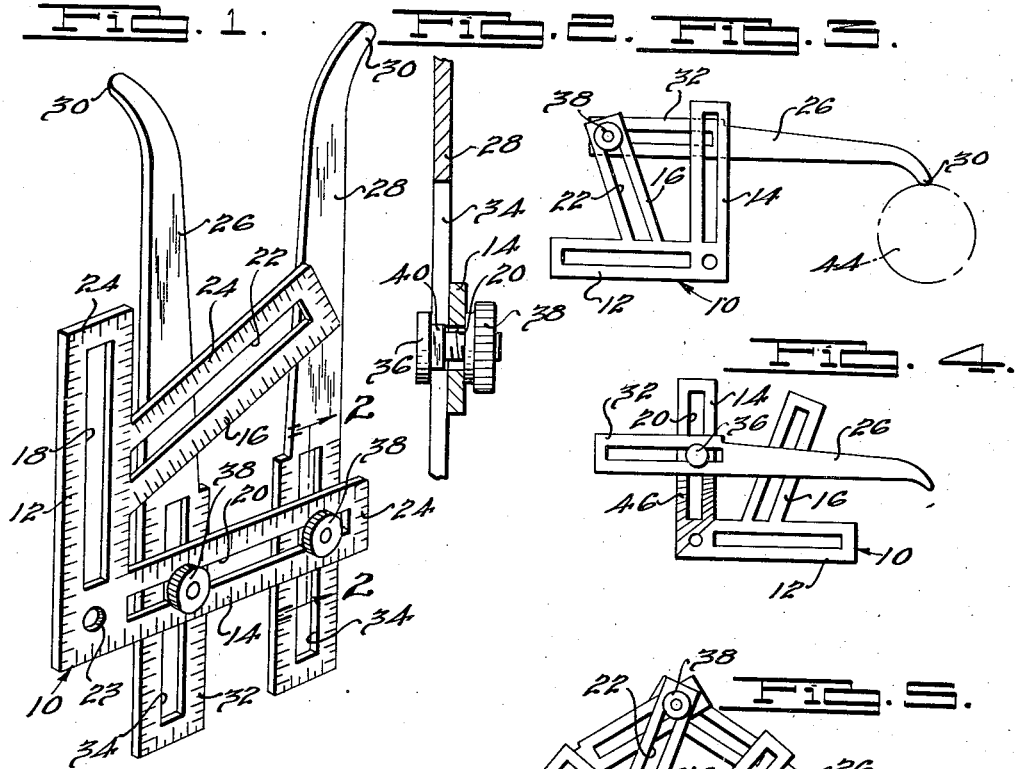
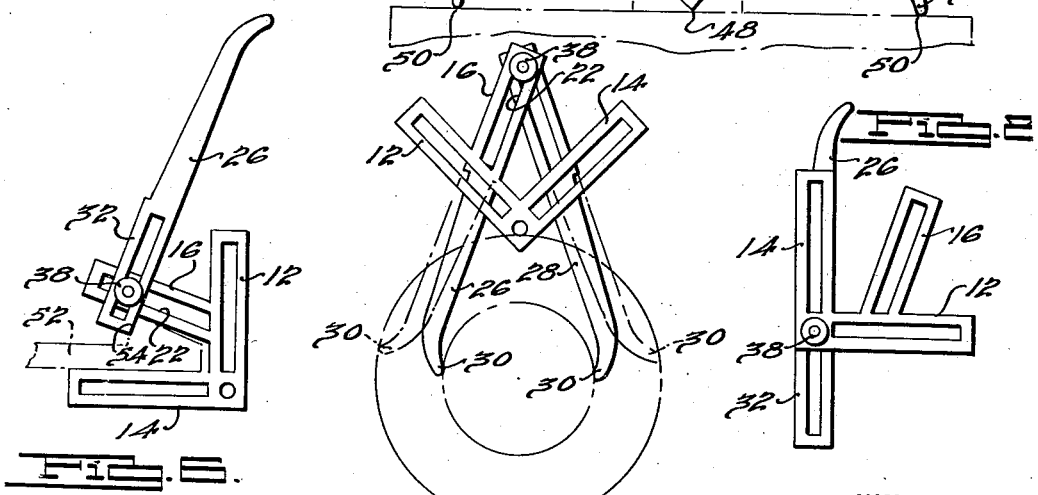
INVENTOR
Eugene G. Grennon.
BY Harness, Dickey & Pierce.
ATTORNEYS.

Patented Jan. 2, 1940

2,185,808

UNITED STATES PATENT OFFICE 2,185,808

CHECKING AND MEASURING DEVICE

Eugene G. Grennon, Wyandotte, Mich.

Application April 7, 1938, Serial No. 200,694

1 Claim. (Cl. 33—75)

This invention relates to checking and measure devices; and particularly relates to a workman's tool which has a multitude of uses.

One of the primary objects of the present invention is to provide a combination tool which may be readily adapted for a number of different uses, such as outside and inside calipers; a square; a height and run-out gauge; a gauge to check from parallel, concave or convex surfaces at three points; and numerous other uses that will be apparent to those skilled in the art from the following description.

A further object of the present invention is to provide a simple combination checking and measuring device which is inexpensive to manufacture and which is, therefore, available to the ordinary workman.

Other objects of the invention will become apparent from the following specification, the drawing relating thereto, and from the claim hereinafter set forth.

In the drawing, in which like numerals are used to designate like parts in the several views throughout:

Figure 1 is a perspective view of the combination tool of the present invention with the elements arranged for one use of the tool;

Fig. 2 is a fragmentary, cross-sectional view taken substantially along the line 2—2 of Fig. 1; and, Figs. 3 to 8 are elevational views, illustrating the elements of the combined tool in various arrangements for a number of different uses.

Referring to the drawing, a square, generally indicated at 10, is illustrated having integral arms 12 and 14 at right angles to each other and in the same plane. Another arm, or third arm 16, is attached to the arm 12 on the same side as the arm 14 and extends at an acute angle to the arm 12 in diverging relation to the arm 14. The arms 12, 14 and 16 are of substantially the same width and have longitudinally extending slots 18, 20 and 22, respectively, which extend substantially the length of their respective arms. The slot 22 in arm 16 is preferably of such length that the outer end thereof lies on the line of bisection of the right angle between the arms 12 and 14. An opening 23, is provided through the square at the corner adjacent the juncture of arms 12 and 14, and the opening 23 is preferably located at the intersection of the center lines of the longitudinal slots 18 and 20. The arms also have suitable scales 24 marked on one face of each for making settings and measurements during use of the tool.

Caliper arms 26 and 28 are provided for removable attachment to the arms of the square and have curved ends 30 at one end of each caliper arm. The opposite ends 32 of the caliper arms are generally rectangular in shape and have longitudinal slots 34 therethrough; and the ends 32 are preferably of the same width as the width of the arms 12, 14 and 16. For removably attaching the caliper arms to the desired arms of the square in the arrangement and relation desired, depending upon the intended use of the tool, screws 36 are provided which are adapted to extend through the aligned slots of the caliper and square arms. The screws threadably engage heads 38 on the ends of the screws which extend through the slots.

The slots of the square and the caliper arms are of substantially the same width, and each screw 36 is provided with a shoulder 40, which is also substantially the same width as the slots and which fits within one of the slots to properly position and align the screws.

The tool of the present invention is particularly designed so that it is capable of a multitude of uses, which means that a workman may purchase for a nominal amount a single tool and by simple arrangements of the elements may perform a number of different operations. In Fig. 1, one of such arrangements is illustrated in which the caliper arms 26 and 28 are arranged substantially parallel to each other and are secured to the slots 20 of arm 14. The arms may be arranged according to the dimensions desired by the scales on the arm, and the arrangement of Fig. 1 is particularly useful for inside calipers and a gauge to check forging die shift and casting core shift.

In Fig. 3 an arrangement of elements is illustrated in which the caliper arm 26 is attached to the slot 22 of the third arm 16. The square 12 is then positioned on a base and the curved end 30 is positioned at the desired level above the base. The tool then may be used as a height and run-out gauge and square. In Fig. 3 a cylindrical work piece 44 is illustrated; and by turning the work piece 44 either on a lathe or rolling it along the base plate, the accuracy of the outer cylindrical surface may be readily determined to check on the true cylindrical character of the work piece.

In Fig. 4 the elements are so arranged that the caliper 26 is attached to the slot 20 of arm 14 with the end 32 extending beyond the arm 14.

The back face of the arm 14 is provided with lines 46 which are marked thereon at definite angles, so that by aligning one edge of the end 32 along one of the lines accurate angular measurements may be made.

In Fig. 5 the elements are so arranged that the caliper arms 26 and 28 are engaged in the slot 22 of the third arm 16. In this arrangement of elements a gauge is provided to check from parallel, concave and convex surfaces at three points. The corner of the square is positioned on the work piece at 48 and the curved ends 30 of the caliper arms engage the work piece at points 50. These three points may then be accurately checked to determine their correctness. This arrangement may be also used to check the relation of a spot center.

In Fig. 6 an arrangement of the elements is illustrated in which the caliper arm 26 is attached to the slot 22 of the third arm 16 with the end 32 projecting downwardly beyond the arm 16. A work piece 52 having a tapered flange 54 is illustrated; and it is evident from the showing in the drawing that by this arrangement of elements the angle of taper may be effectively checked.

In Fig. 7 the elements are arranged as shown in Fig. 5; and when the ends 30 of the caliper arms are directed inwardly as indicated in full lines in the figure the tool may be used as an outside caliper. By reversing the caliper arms so that the curved ends 30 are directed outwardly as indicated in broken lines in Fig. 7 the tool may be used as an inside caliper.

In Fig. 8 the caliper arm 26 is attached to the square through the opening 23 with its end 32 aligned with and extending downwardly beyond the arm 14 so that a square is provided.

From the above it will be evident to those skilled in the art that the present invention provides a novel and simplified tool which may be readily arranged to perform a multitude of functions. Only a few of such uses have been indicated, but it will be readily appreciated that the tool of the present invention is capable of a number of other and different uses.

Formal changes may be made in the specific embodiments of the invention described without departing from the spirit and substance of the invention, the scope of which is commensurate with the appended claim.

What I claim is:

A combination tool including a square having first and second integral arms at right angles to each other, a third arm integral with one of said arms at an acute angle thereto on the same side as the other of said arms and diverging from the other of said arms, all of said arms having elongated slots therethrough, a pair of caliper arms each having a longitudinal slot therethrough adjacent one end thereof, the slot through said third arm being of such a length that its outer end lies substantially on the line of bi-section of the angle between the first and second integral arms, and means for removably attaching said caliper arms to one of said other arms through the slots of the respective arms.

EUGENE G. GRENNON.